United States Patent
Kim et al.

(10) Patent No.: US 12,208,790 B2
(45) Date of Patent: Jan. 28, 2025

(54) VEHICLE SAFETY CONTROL SYSTEM AND VEHICLE SAFETY CONTROL METHOD

(71) Applicant: HYUNDAI MOBIS Co., Ltd., Seoul (KR)

(72) Inventors: Min Seok Kim, Seosan-si (KR); Tae Min Kwon, Seosan-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 297 days.

(21) Appl. No.: 17/674,280

(22) Filed: Feb. 17, 2022

(65) Prior Publication Data

US 2022/0266820 A1    Aug. 25, 2022

(30) Foreign Application Priority Data

Feb. 22, 2021  (KR) .......................... 10-2021-0023252

(51) Int. Cl.
| | |
|---|---|
| *B60W 30/09* | (2012.01) |
| *B60W 10/18* | (2012.01) |
| *B60W 10/20* | (2006.01) |
| *B60W 30/08* | (2012.01) |
| *B60W 50/14* | (2020.01) |
| *B60T 7/22* | (2006.01) |

(52) U.S. Cl.
CPC ............ *B60W 30/09* (2013.01); *B60W 10/18* (2013.01); *B60W 10/20* (2013.01); *B60W 30/08* (2013.01); *B60W 50/14* (2013.01); *B60T 7/22* (2013.01); *B60W 2420/403* (2013.01); *B60W 2420/408* (2024.01); *B60W 2554/802* (2020.02); *B60W 2554/804* (2020.02); *B60W 2710/18* (2013.01); *B60W 2710/20* (2013.01); *B60Y 2300/08* (2013.01)

(58) Field of Classification Search
None
See application file for complete search history.

(56) References Cited

U.S. PATENT DOCUMENTS

| | | | |
|---|---|---|---|
| 2013/0057846 A1* | 3/2013 | Mahlisch | G01S 17/86 356/5.01 |
| 2016/0016561 A1* | 1/2016 | Lee | G01S 13/867 701/70 |
| 2019/0061712 A1* | 2/2019 | Melik-Barkhudarov et al. | B60T 7/22 |
| 2021/0245769 A1* | 8/2021 | Yamaoka | B60W 30/0956 |
| 2021/0309243 A1* | 10/2021 | Park | B60K 6/48 |
| 2021/0387616 A1* | 12/2021 | Kobayashi | G01S 17/86 |

FOREIGN PATENT DOCUMENTS

KR     10-1533884 B1     7/2015

* cited by examiner

*Primary Examiner* — Peter D Nolan
*Assistant Examiner* — Michael F Whalen
(74) *Attorney, Agent, or Firm* — MORGAN, LEWIS & BOCKIUS LLP

(57) ABSTRACT

The present disclosure introduces a vehicle safety control system and a vehicle safety control method, which recognize, in advance, an obstacle approaching the vehicle around the vehicle, and, when the vehicle and the obstacle come near each other in distance, operate SVM to determine the possibility of collision between the vehicle and the obstacle in advance, and prevent a collision accident by controlling the vehicle on the basis of the possibility of collision between the vehicle and the obstacle.

8 Claims, 4 Drawing Sheets

VEHICLE SAFETY CONTROL SYSTEM AND VEHICLE SAFETY CONTROL METHOD

CROSS-REFERENCE TO RELATED APPLICATION(S)

This application is based on and claims priority under 35 U.S.C. 119 to Korean Patent Application No. 10-2021-0023252, filed on Feb. 22, 2021, in the Korean Intellectual Property Office, the disclosure of which is herein incorporated by reference in its entirety.

BACKGROUND

1. Technical Field

The present disclosure relates to a vehicle safety control system and a vehicle safety control method, wherein obstacles around a vehicle are identified, and obstacle positions are accurately identified through SVM, thereby preventing collision accidents between the vehicle and obstacles.

2. Description of the Prior Art

A vehicle is controlled by using information collected through sensors in order to provide the driver with driving convenience. For example, vehicle autocruise controls the vehicles to automatically travel at a speed set by the driver without separate acceleration/deceleration manipulation, and if a preceding vehicle is sensed, maintains the distance from the preceding vehicle to prevent collision. As such, collision with the preceding vehicle can be prevented by maintaining the distance therefrom.

In addition, SVM (Surround View Monitoring) is applied to vehicles to sense adjacent peripheral vehicles or obstacles. The SVM operates only in specific situations (for example, driving for parking), and efficient use of SVM is accordingly limited. Moreover, SVM is driven only when other cars or obstacles are adjacent to the vehicle, thereby degrading the reliability of SVM.

The above descriptions regarding background technologies have been made only to help understanding of the background of the present disclosure, and are not to be deemed by those skilled in the art to correspond to already-known prior arts.

SUMMARY

The present disclosure has been proposed to solve the above-mentioned problems, and it is an aspect of the present disclosure to provide a vehicle safety control system and a vehicle safety control method, wherein obstacles (including other vehicles) around a vehicle are identified in advance, and the vehicle is controlled according to the distance between the vehicle and the obstacles, thereby preventing collision between the vehicle and the obstacles.

In accordance with an aspect of the present disclosure, a vehicle safety control system may include: a sensing unit configured to sense an obstacle around a vehicle; a determination unit configured to operate surround view monitoring (SVM) when the obstacle is sensed by the sensing unit, and to determine a distance between the vehicle and the obstacle, sensed through the SVM; and a controller configured to pre-store a warning range and a danger range according to the distance between the vehicle and the obstacle, transmit a warning message when the distance between the vehicle and the obstacle corresponds to the warning range, and decelerate or brake the vehicle when the distance between the vehicle and the obstacle corresponds to the danger range.

The sensing unit may include a radar sensor or a camera sensor and thus may sense an obstacle in a wider range than the SVM.

The determination unit may operate the SVM when the distance between the vehicle and the obstacle sensed by the sensing unit is within a predetermined distance.

The controller may derive a degree of collision danger according to the distance between the vehicle and the obstacle when the distance between the vehicle and the obstacle corresponds to the danger range.

The controller may use the distance between the vehicle and the obstacle and a relative speed between the vehicle and the obstacle to derive a reaching time at which the obstacle will reach the vehicle, and may store the reaching time as the degree of collision danger.

The controller may decelerate the vehicle when the degree of collision danger does not reach a predetermined degree of danger.

The controller may control steering of the vehicle such that the vehicle avoids the obstacle when the degree of collision danger does not reach the predetermined degree of danger.

The controller may brake the vehicle when the degree of collision danger reaches the predetermined degree of danger.

In accordance with another aspect of the present disclosure, a vehicle safety control method may include: a first sensing step of sensing an obstacle around a vehicle; a second sensing step of operating surround view monitoring (SVM) when the obstacle is sensed in the first sensing step; a determination step of determining the distance between the vehicle and the obstacle, sensed through the SVM; and a control step of pre-storing a warning range and a danger range according to the distance between the vehicle and the obstacle, transmitting a warning message when the distance between the vehicle and the obstacle corresponds to the warning range, and decelerating or braking the vehicle when the distance between the vehicle and the obstacle corresponds to the danger range.

In the determination step, when the distance between the vehicle and the obstacle is within a predetermined distance, the SVM may be operated.

In the control step, when the distance between the vehicle and the obstacle corresponds to the danger range, the degree of collision danger according to the distance between the vehicle and the obstacle may be derived.

In the control step, a reaching time at which the obstacle will reach the vehicle may be derived by using the distance between the vehicle and the obstacle and the relative speed between the vehicle and the obstacle, and the reaching time may be stored as the degree of collision danger.

In the control step, when the degree of collision danger does not reach a predetermined degree of danger, the vehicle may be decelerated.

In the control step, when the degree of collision danger does not reach the predetermined degree of danger, steering of the vehicle may be controlled such that the vehicle avoids the obstacle.

In the control step, when the degree of collision danger reaches the predetermined degree of danger, the vehicle may be braked.

According to a vehicle safety control system having the above-described structure and a vehicle safety control method, an obstacle approaching a vehicle from the periphery thereof is recognized in advance, SVM is operated when the vehicle and the obstacle come near each other in distance, and the possibility of collision between the vehicle and the obstacle is determined in advance, thereby preventing a collision accident by controlling the vehicle on the basis of the possibility of collision between the vehicle and the obstacle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, a vehicle safety control system and a vehicle safety control method, according to an exemplary embodiment of the present disclosure, will be described with reference to the accompanying drawings.

Figure 1:
FIG. 1 illustrates a configuration of a vehicle safety control system according to the present disclosure.
Figure 2:
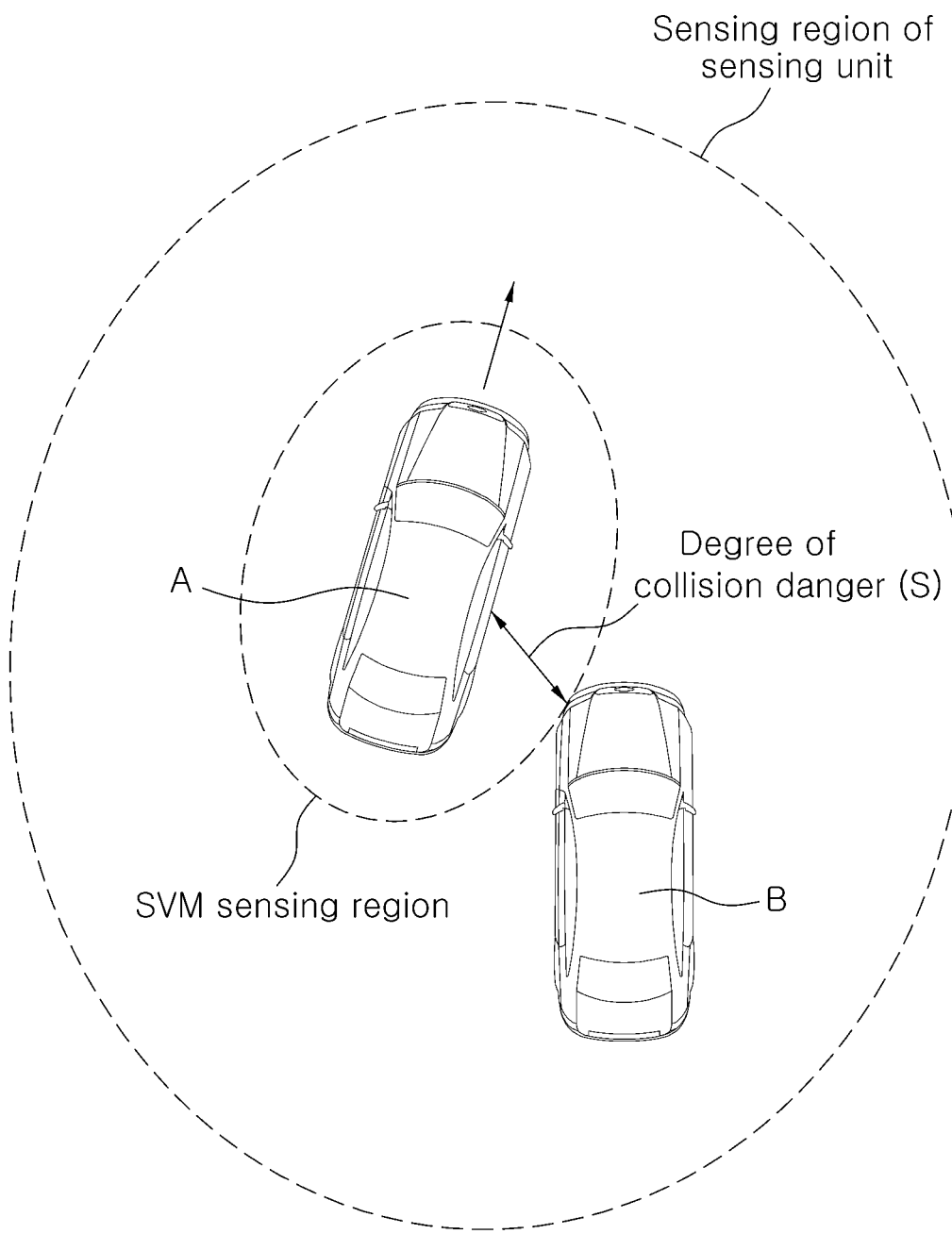
FIG. 2 is a view provided for describing the present disclosure.
Figure 3:
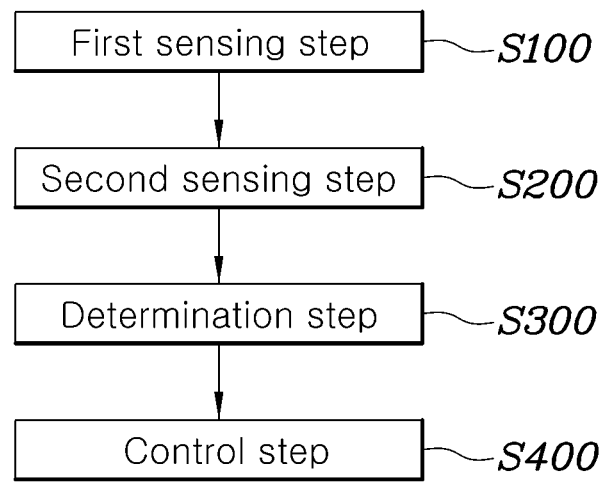
FIGS. 3 and 4 are flowcharts illustrating a vehicle safety control method according to the present disclosure.
Figure 4:
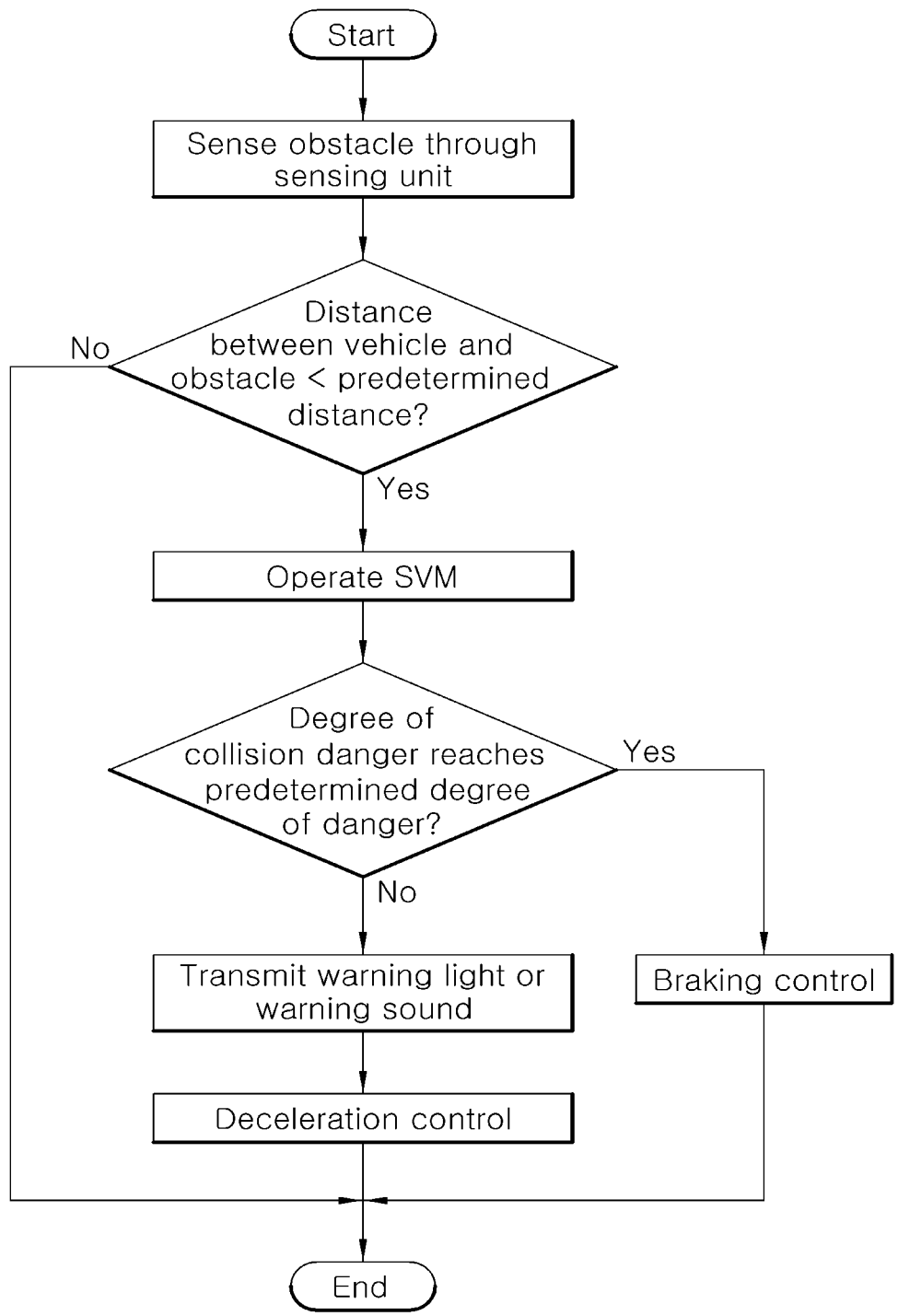

FIG. 1 illustrates a configuration of a vehicle safety control system according to the present disclosure, FIG. 2 is a view provided for describing the present disclosure, and FIGS. 3 and 4 are flowcharts illustrating a vehicle safety control method according to the present disclosure.

As illustrated in FIG. 1, a vehicle safety control system according to the present disclosure includes: a sensing unit 100 configured to sense an obstacle B around a vehicle A; a determination unit 200 configured to operate surround view monitoring (SVM) when the obstacle B is sensed by the sensing unit 100, and determine the distance between the vehicle A and the obstacle B, sensed through the SVM; and a controller 300 configured to pre-store a warning range and a danger range according to the distance between the vehicle A and the obstacle B, transmit a warning message when the distance between the vehicle A and the obstacle B, sensed through the SVM, corresponds to the warning range, and decelerate or brake the vehicle A when the distance between the vehicle A and the obstacle B corresponds to the danger range.

The sensing unit 100 may include a radar sensor or a camera sensor, and thus may sense an obstacle B in a wider range than the SVM. The sensing unit 100 may employ a LiDAR or an ultrasonic sensor in addition to the radar sensor or the camera sensor. Thus, the sensing unit 100 may sense an obstacle B in a wide region around the vehicle A, and may identify the obstacle B in advance, thereby recognizing, in advance, the obstacle B including another vehicle approaching the vehicle A.

The determination unit 200 of the vehicle safety control system according to an exemplary embodiment of the present disclosure may be a processor (e.g., computer, microprocessor, CPU, ASIC, circuitry, logic circuits, etc.). The determination unit 200 may be implemented by a non-transitory memory storing, e.g., a program(s), software instructions reproducing algorithms, etc., which, when executed by the processor, performs various functions described hereinafter. Herein, the memory and the processor may be implemented as separate semiconductor circuits. Alternatively, the memory and the processor may be implemented as a single integrated semiconductor circuit. The processor may embody one or more processor(s).

The controller 300 of the vehicle safety control system according to an exemplary embodiment of the present disclosure may be an electric circuitry (e.g., processor) that executes instructions of software which thereby performs various functions described hereinafter.

In the present disclosure, the surround view monitoring (SVM) is used to identify the obstacle B adjacent to the vehicle A. That is, when the obstacle B is sensed by the sensing unit 100, the determination unit 200 operates a surround view monitoring (SVM) unit to accurately determine the possibility of collision between the vehicle A and the sensed obstacle B. The SVM unit may be installed in the front and rear and the side of the vehicle A, and may be a camera attached near a side mirror. In this way, the determination unit 200 may determine the distance between the vehicle A and the sensed obstacle B, sensed through the SVM, thereby collecting information for determining the possibility of collision according to the distance between the vehicle A and the obstacle B.

The controller 300 pre-stores a danger range and a warning range according to the distance between the vehicle A and the obstacle B, and determines whether information about the distance between the vehicle A and the obstacle B, identified through the SVM in the determination unit 200, is included in the warning range or the danger range. That is, the controller 300 transmits a warning message when the distance between the vehicle A and the obstacle B corresponds to the warning range, and decelerates or brakes the vehicle A when the distance between the vehicle A and the obstacle B corresponds to the danger range. Thus, when the distance between the vehicle A and the obstacle B, sensed through the SVM, corresponds to the warning range, the controller 300 blinks a warning light or transmits a warning sound, to allow a driver to recognize the presence of the obstacle B around the vehicle A. Further, when the distance between the vehicle A and the obstacle B corresponds to the danger range, the controller 300 decelerates or brakes the vehicle A to prevent a collision accident from being caused by a driver's miscalculation.

Thus, as illustrated in FIG. 2, whether to operate the SVM is determined by identifying the obstacle B approaching the vehicle A in advance through the sensing unit 100. That is, when the obstacle B enters the sensing region of the sensing unit 100, the SVM is operated to determine the possibility of collision between the vehicle A and the obstacle B, and traveling of the vehicle A is controlled to allow the vehicle A to avoid colliding with the obstacle B and thus safely travel.

Specifically describing the present disclosure, the determination unit 200 operates the SVM when the distance between the vehicle A and the obstacle B sensed by the sensing unit 100 is within a predetermined distance. That is, the sensing unit 100 is configured to sense the obstacle B in a relatively wide region compared with the SVM, and thus the sensing unit 100 may identify the obstacle B moving toward the vehicle A. When the obstacle B is sensed by the sensing unit 100, the determination unit 200 determines whether the distance between the sensed obstacle B and the vehicle A is within the predetermined distance. When the distance between the obstacle B and the vehicle A is within the predetermined distance, the determination unit 200 operates the SVM to accurately determine the distance between the vehicle A and the obstacle B.

When the distance between the obstacle B and the vehicle A, determined through the SVM, corresponds to the warning range, the controller 300 transmits a warning sound through a warning light or a speaker provided in the vehicle A.

Further, when the distance between the vehicle A and the obstacle B corresponds to the danger range, the controller 300 derives the degree of collision danger based on the distance between the vehicle A and the obstacle B. That is, when the distance between the vehicle A and the obstacle B corresponds to the danger range, the controller 300 derives the degree of collision danger and controls the traveling of the vehicle A on the basis of the degree of collision danger, thereby avoiding a collision between the vehicle A and the obstacle B to ensure safety, and preventing traveling convenience of a passenger from being reduced by excessively controlling the vehicle A.

Specifically, the controller 300 uses the distance between the vehicle A and the obstacle B and the relative speed between the vehicle A and the obstacle B to derive a reaching time at which the obstacle B will reach the vehicle A, and stores the reaching time as the degree of collision danger. That is, a reaching time at which the vehicle A and the obstacle B will reach each other is derived by collating the distance between the vehicle A and the obstacle B, collected through the sensing unit 100 and the SVM, and the relative speed between the vehicle A and the obstacle B. In the state in which the vehicle A travels or the obstacle B moves toward the vehicle A, the controller 300 may derive at the reaching time at which the vehicle A and the obstacle B will reach each other, thereby efficiently controlling the steering, braking, or the like of the vehicle. Like this, the controller 300 may temporarily store, as the degree of collision danger, the reaching time at which the vehicle A and the obstacle B will reach each other, and the degree of collision danger is adjusted on the basis of the changing distance between the vehicle A and the obstacle B and the changing relative speed between the vehicle A and the obstacle B. That is, in the state in which the vehicle A being stopped starts or the vehicle A is traveling, the degree of collision danger is configured in consideration of the distance between the vehicle A and the obstacle B, the relative speed therebetween, etc., and thus accurate vehicle control may be performed based on the degree of collision danger between the vehicle A and the obstacle B.

In this way, when the degree of collision danger is derived by the controller 300, the controller 300 decelerates the vehicle A if the degree of collision danger does not reach a predetermined degree of danger. Further, when the degree of collision danger does not reach the predetermined degree of danger, the controller 300 may further control steering of the vehicle A such that the vehicle A avoids the obstacle B. The predetermined degree of danger may be pre-stored as a situation in which the possibility of collision between the vehicle A and the obstacle B is very high.

That is, when the degree of collision danger does not reach the predetermined degree of danger, the vehicle A is in a state capable of avoiding the obstacle B even while the vehicle A is traveling. Therefore, the controller 300 decelerates the vehicle A to allow the vehicle A to avoid colliding with the obstacle B. In addition, the controller 300 further controls steering of the vehicle A so that the vehicle A moves in a direction in which the vehicle A safely avoids the obstacle B.

When the degree of collision danger reaches the predetermined degree of danger, the controller 300 brakes the vehicle A. That is, when the degree of collision danger reaches the predetermined degree of danger, the vehicle A and the obstacle B are in a state in which the possibility of collision therebetween is very high. Therefore, the controller 300 brakes the vehicle A such that impact caused by collision between the vehicle A and the obstacle B is reduced.

For example, if the predetermined degree of danger is two seconds, the controller 300 decelerates the traveling speed of the vehicle A when the degree of collision danger is derived as three seconds, and controls, based on the direction of approach of the obstacle B, steering of the vehicle in a direction in which the vehicle avoids the obstacle B. If the degree of collision danger is derived as one second, the controller 300 completely brakes the vehicle A such that the vehicle A avoids colliding with the obstacle B and impact caused by collision is reduced even in collision therebetween.

In the present disclosure, the obstacle B approaching the vehicle A around the vehicle A is recognized in advance, the SVM is operated to determine the possibility of collision between the vehicle A and the obstacle B in advance when the vehicle A and the obstacle B come near each other in distance, and a collision accident is prevented by controlling the vehicle A based on the possibility of collision between the vehicle A and the obstacle B.

As illustrated in FIGS. 3 and 4, a vehicle A safety control method according to the present disclosure includes: a first sensing step S100 of sensing an obstacle B around a vehicle A; a second sensing step S200 of operating surround view monitoring (SVM) when the obstacle B is sensed in the first sensing step S100; a determination step S300 of determining the distance between the vehicle A and the obstacle B, sensed through the SVM; and a control step S400 of pre-storing a warning range and a danger range according to the distance between the vehicle A and the obstacle B, transmitting a warning message when the distance between the vehicle A and the obstacle B, sensed through the SVM, corresponds to the warning range, and decelerating or braking the vehicle A when the distance between the vehicle A and the obstacle B corresponds to the danger range.

In the first sensing step S100, the obstacle B may be sensed in a wide region around the vehicle A, and the obstacle B including another vehicle approaching the vehicle A may be recognized in advance by identifying the obstacle in advance.

Subsequently, when the obstacle B is sensed in the first sensing step S100, the SVM is operated to determine the distance between the sensed obstacle B and the vehicle A, and information for determining the possibility of collision according to the distance between the vehicle A and the obstacle B is collected in the determination step S300. In the determination step S300, the SVM is operated when the distance between the obstacle B and the vehicle A is within a predetermined distance.

Subsequently, in the control step S400, when the distance between the vehicle A and the obstacle B corresponds to the warning range, a warning message is transmitted, and when the distance between the vehicle A and the obstacle B corresponds to the danger range, the vehicle A is decelerated or braked. Thus, when the distance between the vehicle A and the obstacle B, sensed through the SVM, corresponds to the warning range, the controller 300 blinks a warning light or transmits a warning sound such that a driver recognizes the presence of the obstacle B around the vehicle A. Further, when the distance between the vehicle A and the obstacle B corresponds to the danger range, the controller 300 decelerates or brakes the vehicle A to prevent a collision accident from being caused by the driver's miscalculation.

Specifically, in the control step S400, when the distance between the vehicle A and the obstacle B corresponds to the danger range, the degree of collision danger according to the distance between the vehicle A and the obstacle B is derived.

In the control step S400, the distance between the vehicle A and the obstacle B and the relative speed between the vehicle A and the obstacle B may be used to derive a reaching time at which the obstacle B will reach the vehicle A, and the reaching time may be stored as the degree of collision danger.

Thus, in the control step S400, when the degree of collision danger does not reach a predetermined degree of danger, the vehicle A is decelerated. In addition, in the control step S400, when the degree of collision danger does not reach the predetermined degree of danger, steering of the vehicle A may be controlled such that the vehicle A avoids the obstacle B.

In the control step S400, when the degree of collision danger reaches the predetermined degree of danger, the vehicle A may be braked.

The vehicle A safety control system and the vehicle A safety control method, having the above-described structure, recognize, in advance, the obstacle B approaching the vehicle A around the vehicle A, operate the SVM when the vehicle A and the obstacle B come near each other in distance to determine the possibility of collision between the vehicle A and the obstacle B in advance, and prevent a collision accident by controlling the vehicle A on the basis of the possibility of collision between the vehicle A and the obstacle B.

The present disclosure has been illustrated and described in relation to specific embodiments. However, it will be obvious to those skilled in the art that the present disclosure can be variously modified and changed without departing from the technical sprit of the present disclosure provided in the following claims.

What is claimed is:

1. A vehicle safety control system comprising:
    a sensing unit configured to sense an obstacle around a vehicle;
    a determination unit configured to operate surround view monitoring (SVM) via cameras installed in a front, a rear, and a side of the vehicle when the obstacle is sensed by the sensing unit having a wider sensing range than the SVM, and to determine a distance between the vehicle and the obstacle, sensed through the SVM; and
    a controller configured to pre-store a warning range and a danger range according to the distance between the vehicle and the obstacle, to transmit a warning message when the distance between the vehicle and the obstacle corresponds to the warning range, and to decelerate or brake the vehicle when the distance between the vehicle and the obstacle corresponds to the danger range,
    wherein the controller is further configured to:
    derive a degree of collision danger according to the distance between the vehicle and the obstacle when the distance between the vehicle and the obstacle corresponds to the danger range,
    decelerate the vehicle when the degree of collision danger is above a predetermined degree of danger, and
    brake the vehicle such that the vehicle is in a stopped state when the degree of collision danger is at or below the predetermined degree of danger.

2. The system of claim 1, wherein the determination unit is further configured to operate the SVM when the distance between the vehicle and the obstacle is within a predetermined distance.

3. The system of claim 1, wherein the controller is further configured to use the distance between the vehicle and the obstacle and a relative speed between the vehicle and the obstacle to derive a reaching time at which the obstacle reaches the vehicle, and to store the reaching time as the degree of collision danger.

4. The system of claim 1, wherein the controller is further configured to control steering of the vehicle such that the vehicle avoids the obstacle when the degree of collision danger is above the predetermined degree of danger.

5. A vehicle safety control method comprising:
    a first sensing step of sensing an obstacle around a vehicle by a sensing unit;
    a second sensing step of operating surround view monitoring (SVM) via cameras installed in a front, a rear, and a side of the vehicle when the obstacle is sensed in the first sensing step by the sensing unit having a wider sensing range than the SVM;
    a determination step of determining a distance between the vehicle and the obstacle, sensed through the SVM; and
    a control step of pre-storing a warning range and a danger range according to the distance between the vehicle and the obstacle, transmitting a warning message when the distance between the vehicle and the obstacle corresponds to the warning range, and decelerating or braking the vehicle when the distance between the vehicle and the obstacle corresponds to the danger range,
    wherein, in the control step,
    when the distance between the vehicle and the obstacle corresponds to the danger range, a degree of collision danger according to the distance between the vehicle and the obstacle is derived,
    when the degree of collision danger is above a predetermined degree of danger, the vehicle is decelerated, and
    when the degree of collision danger is at or below the predetermined degree of danger, the vehicle is braked such that the vehicle is in a stopped state.

6. The method of claim 5, wherein, in the determination step, when the distance between the vehicle and the obstacle is within a predetermined distance, the SVM is operated.

7. The method of claim 5, wherein, in the control step, a reaching time at which the obstacle reaches the vehicle is derived by using the distance between the vehicle and the obstacle and a relative speed between the vehicle and the obstacle, and the reaching time is stored as the degree of collision danger.

8. The method of claim 5, wherein, in the control step, when the degree of collision danger is above the predetermined degree of danger, steering of the vehicle is controlled such that the vehicle avoids the obstacle.

* * * * *